(12) United States Patent
Demerly et al.

(10) Patent No.: US 11,279,358 B2
(45) Date of Patent: Mar. 22, 2022

(54) SYSTEM AND METHOD TO CONTROL THE VELOCITY OF A VEHICLE

(71) Applicant: Veoneer US, Inc., Southfield, MI (US)

(72) Inventors: Jon D. Demerly, Byron, MI (US); Hsin-Hsiang Yang, Ann Arbor, MI (US)

(73) Assignee: Veoneer US, Inc., Southfield, MI (US)

( * ) Notice: Subject to any disclaimer, the term of this patent is extended or adjusted under 35 U.S.C. 154(b) by 240 days.

(21) Appl. No.: 16/362,155

(22) Filed: Mar. 22, 2019

(65) Prior Publication Data

US 2020/0298855 A1    Sep. 24, 2020

(51) Int. Cl.
*B60W 30/18*     (2012.01)
*B60W 10/06*     (2006.01)
*B60W 10/18*     (2012.01)

(52) U.S. Cl.
CPC ...... *B60W 30/18063* (2013.01); *B60W 10/06* (2013.01); *B60W 10/18* (2013.01); *B60W 2520/10* (2013.01); *B60W 2520/28* (2013.01); *B60W 2710/0605* (2013.01); *B60W 2710/18* (2013.01); *B60Y 2300/18058* (2013.01)

(58) Field of Classification Search
CPC .................. B60W 10/06; B60W 30/18063
See application file for complete search history.

(56) References Cited

U.S. PATENT DOCUMENTS

| | | | |
|---|---|---|---|
| 2003/0171186 A1* | 9/2003 | Okada | B60K 31/04 477/71 |
| 2004/0215385 A1* | 10/2004 | Aizawa | B60T 7/12 701/93 |
| 2012/0179341 A1 | 7/2012 | Hou | |
| 2015/0321671 A1* | 11/2015 | Simmons | B60W 10/18 701/48 |
| 2017/0291604 A1 | 10/2017 | Mukkala, II et al. | |
| 2018/0361853 A1 | 12/2018 | Grajkowski et al. | |
| 2020/0180602 A1* | 6/2020 | Jeong | B60W 20/20 |

OTHER PUBLICATIONS

Search Report of the International Searching Authority regarding corresponding PCT App. PCT/US20/24288; dated Jun. 24, 2020.
Onieva, E., et al.,"Throttle and brake pedals automation for populated areas," Robotica (2010) vol. 28, pp. 509-516. Dec. 11, 2009, [online] [retrieved on Jun. 4, 2020 (Jun. 4, 2020)] Retrieved from the Internet < URL: https://www.researchgate.net/publication/231881850_Throttle_and_brake_pedals_automation_for_populated_areas >, entire document, especially Abstract; p. 4-6.

* cited by examiner

*Primary Examiner* — Jess Whittington
(74) *Attorney, Agent, or Firm* — Dickinson Wright PLLC

(57) ABSTRACT

A system and method for controlling the velocity of a vehicle includes a processor, a velocity sensor in communication with the processor, a throttle actuator in communication with the processor, and a brake actuator in communication with the processor. The processor is set either the throttle position of the vehicle via the throttle actuator or the brake pedal position of the vehicle via the brake actuator based whether the augmented acceleration is greater than or equal to a gear acceleration, whether the actual velocity is above a crawl speed, and a lookup table.

12 Claims, 6 Drawing Sheets

SYSTEM AND METHOD TO CONTROL THE VELOCITY OF A VEHICLE

BACKGROUND

1. Field of the Invention

The present invention generally relates to systems and methods for controlling the velocity of a vehicle, especially at low speeds.

2. Description of Related Art

Autonomous vehicles are vehicles that have the ability to control both velocity and their steering. However, autonomous vehicles, especially in low speed situations, need to be able to maintain their speed and be able to brake in a sufficient manner.

Autonomous vehicles that utilize traditional internal combustion or diesel engines generally utilize the braking system to control the speed of the vehicle. However, as is well known, the speed of the vehicle can in part be controlled by utilizing the engine torque of the vehicle. As such, the engine torque of the vehicle can be utilized to slow down the vehicle instead of or compliment to the braking system. Further complicating this, is that when controlling the speed below the crawling speed of the vehicle driven by the minimum engine torque, the brake pedal is the only controllable input to the system.

As such, controlling a vehicle at low speed environments so that the vehicle operates in a smooth and fluid like manner poses several problems especially with regards of how to appropriately slow down the vehicle by either using engine braking, traditional braking, or some combination of the two.

SUMMARY

A system and method for controlling the velocity of a vehicle includes a processor, a velocity sensor in communication with the processor, a throttle actuator in communication with the processor, and a brake actuator in communication with the processor. The processor is set either the throttle position of the vehicle via the throttle actuator or the brake pedal position of the vehicle via the brake actuator based whether the augmented acceleration is greater than or equal to a gear acceleration, whether the actual velocity is above a crawl speed, and a lookup table.

Further objects, features, and advantages of this invention will become readily apparent to persons skilled in the art after a review of the following description, with reference to the drawings and claims that are appended to and form a part of this specification.

DETAILED DESCRIPTION

Figure 1:
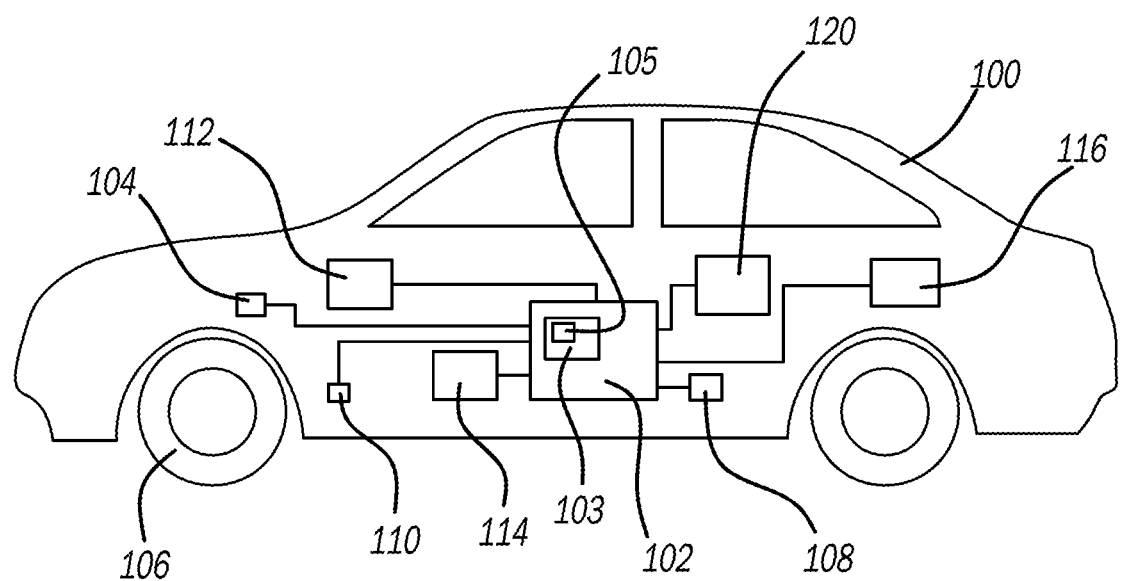
FIG. 1 illustrates a block diagram of a vehicle having a system for controlling the steering of the vehicle.

Referring to FIG. 1, a vehicle 100 is shown. It should be understood that the vehicle 100 could be any type of vehicle capable of transporting persons or items from one point to another. As such, the vehicle may be a car, truck, commercial vehicle, tractor trailer, farm tractor, mining vehicle, and the like. Again, the vehicle 100 may be any type of vehicle so long as it is capable of transporting persons or items from one location to another.

Here, the vehicle 100 includes a processor 102. The processor 102 may be a single processor of may be multiple processors working in concert. Generally, the processor is arranged within the interior of the vehicle 100. The processor 102 may be separately connected to or may incorporate a memory device 103. Here, the memory device 103 is shown to be integrated within the processor 102, but it should be understood that the memory device 103 may be separate from the processor 102. The memory device 103 may be any type of memory device capable of storing digital information. As such, the memory device 103 may be a solid-state memory device, optical memory device, magnetic memory device, and the like. The memory device may include instructions 105 and/or other data, such as lookup tables. In the case of instructions, instructions may include executable code for executing any one of the methods disclosed in this specification.

The processor 102 may be connected to a number of different sensors for sensing different physical parameters of the vehicle. For example, the processor 102 may be in communication with the velocity sensor 104. The velocity sensor 104 may be a wheel speed sensor mounted and arranged within the vehicle 100 so as to be able to determine the wheel speed of at least one wheel 106 of the vehicle. Of course, it should be understood that the vehicle 100 may have multiple wheel speed sensors for each of the wheels.

Additionally, the vehicle 100 may include an accelerometer 108 also in communication with the processor 102. The accelerometer 108 is capable of determining the acceleration of the vehicle 100 and is mounted in the vehicle to accomplish this task. The accelerometer 108 may measure acceleration any one of a number of directions including lateral and/or transverse acceleration. The vehicle 100 may also include a steering wheel angle sensor 110 configured to determine the steering wheel angle of the vehicle 100.

The processor 102 may be connected to a number of different vehicle systems capable of controlling the vehicle 100. For example, the processor 102 may be in communication with a steering control system 112. The steering control system 112 may be connected to a steering system that essentially controls the steering of the vehicle 100 based on instructions from the processor 102.

The processor 102 may also be in communication with a throttle control system 114. The throttle control system 114 is configured to control the throttle position of the engine of the vehicle. As the throttle position of the engine of the vehicle changes, the vehicle can be instructed to change speeds.

The processor 102 may also be in communication with the brake control system 116 as configured to control the brakes of the vehicle. The brakes of the vehicle allow the vehicle to slow down and/or remain in a stopped position. The brake control system 116 receives instructions from the processor 102 and is able to actuate the vehicle brakes so as to slow the vehicle 100 down or keep it in a stopped position. It should be understood that the throttle control system 114 in the brake control system 116 may be incorporated within a single control unit. This may be because the ability to control the brakes and/or throttle the vehicle are both related to controlling the velocity of the vehicle.

The processor 102 may also be in communication with an autonomous vehicle control system 120 that provides instructions to the processor to relay these instructions to any which one of the vehicle control systems, such as the steering control system 112, throttle control system 114 and/or the braking control system 116. For example, the autonomous vehicle control system 120 may provide instructions to the processor 102 to accelerate the vehicle, slow down the vehicle, apply the brakes, and other commands. These commands may be arrange as an array of commands.

Figure 2:
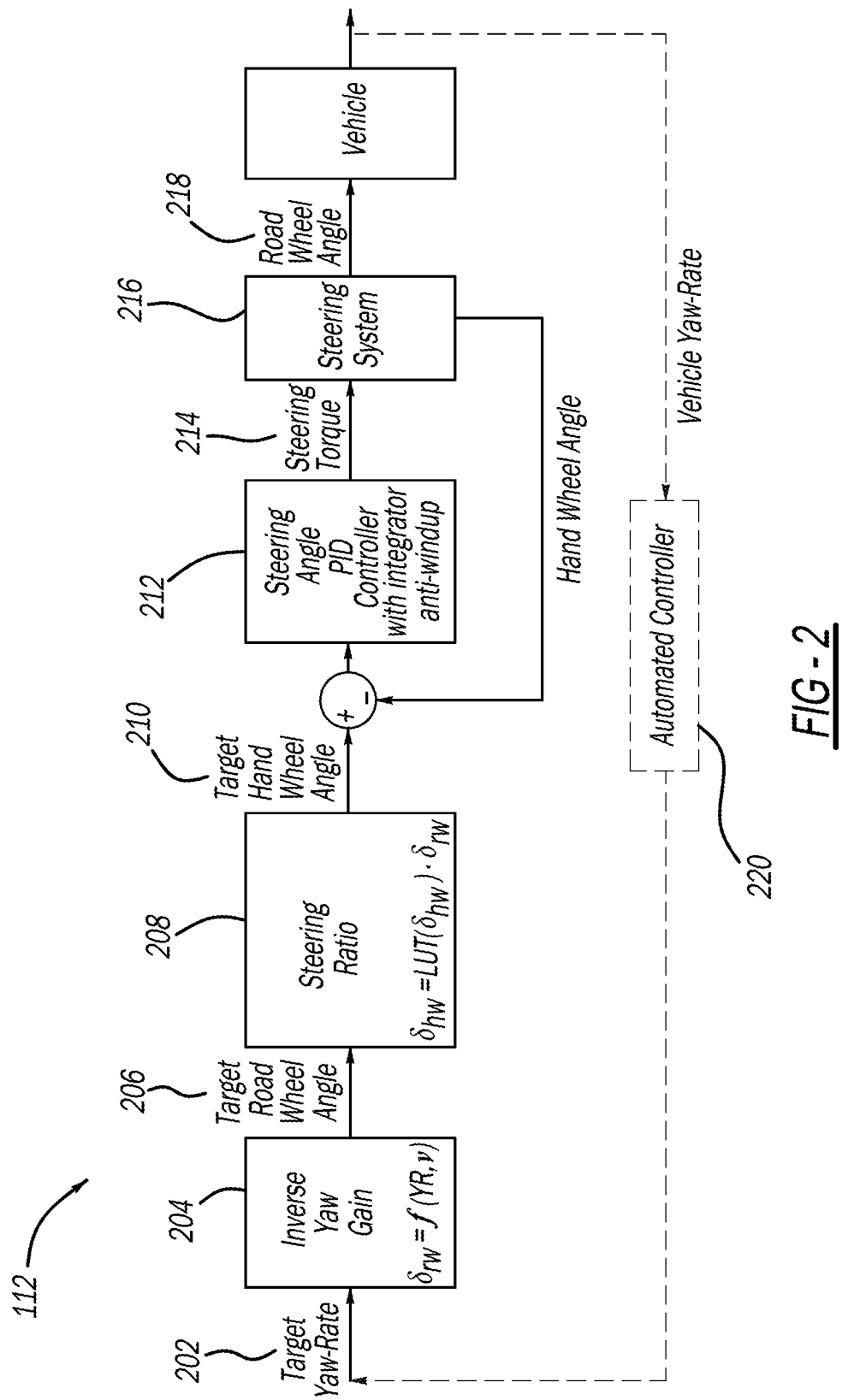
FIG. 2 illustrates a block diagram of a steering control system.

Referring to FIG. 2, a more detailed diagram of the steering control system 112 is shown. Here, the steering control system receives a target yaw rate 202 for the vehicle to be steered towards. An inverse yaw gain module 204 determines a target road wheel angle 206. The steering ratio module 208 takes the target road wheel angle 206 and creates a target hand wheel angle 210. From there, a steering angle controller 212 takes the target hand wheel angle 210 and determines an amount of torque 214 to apply to a steering system 216.

From there, as the steering system 216 steers the vehicle, the hand wheel angle changes and is fed back into the steering angle controller 212. An automated controller 220 may also be utilized to automate the vehicle yaw rate determination.

Figure 3:
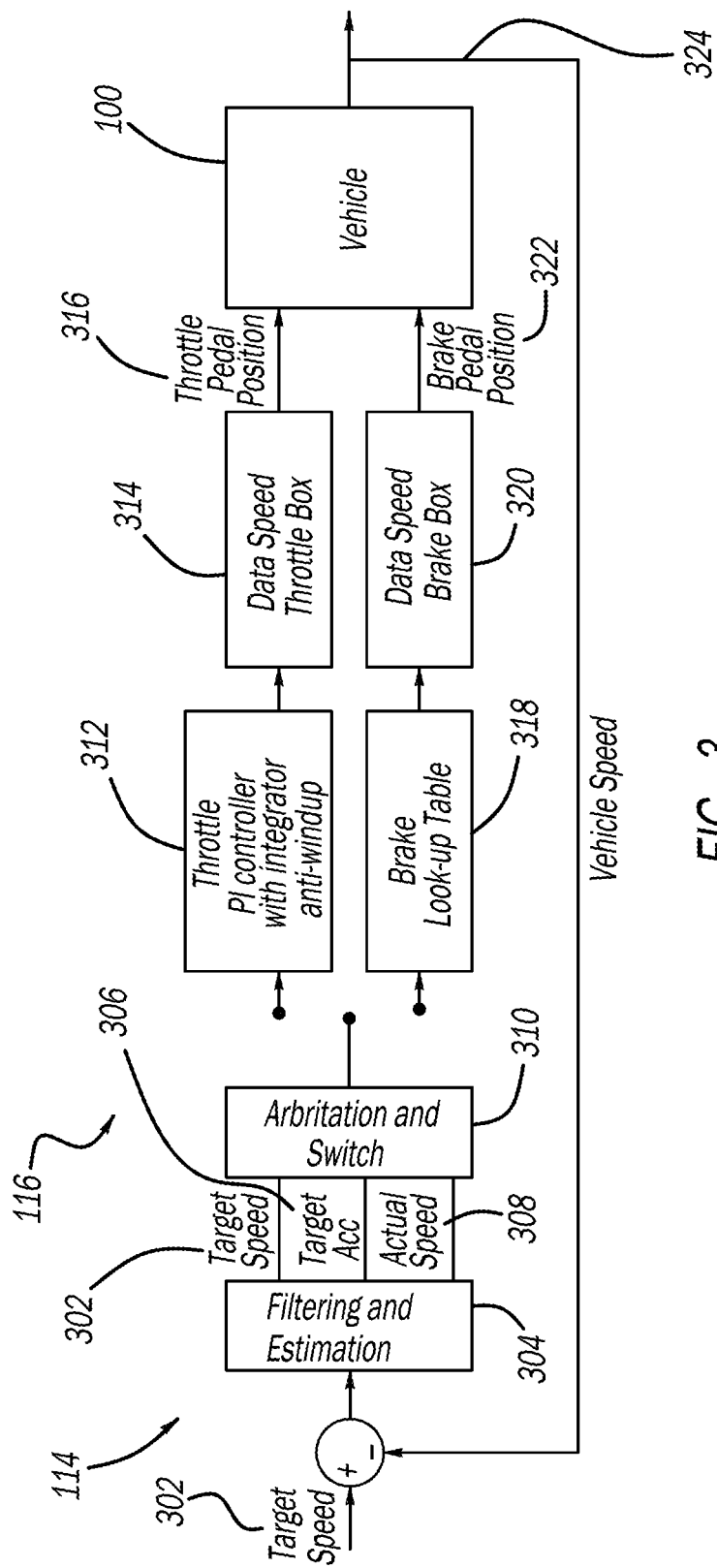
FIG. 3 illustrates a block diagram of a throttle control system and a brake control system.

Referring to FIG. 3, a more detailed view of the throttle control system 114 and brake control system 116 is shown. It could be understood that the throttle control system 114 and the brake control system 116 may be separate components or may be integrated together as shown in FIG. 3.

Here, a filtering and estimation module 304 receives a target speed 302. The filtering estimation module 304 determines a target speed 302 and a target acceleration 306 from the target speed 302. In addition, a filtering estimation module 304 determines the actual speed 308 that may be provided by the velocity sensor 104, which as stated previously, may be a wheel speed sensor.

Also shown is a switch 310. The switch 310 determines if the throttle or brake should be controlled. This switch 310 may have the ability to control both the throttle and the brake at the same time. Here, the throttle controller 312 communicates to the throttle box 314 which then adjusts the throttle pedal position 316 of the vehicle 100. By adjusting the throttle position, the vehicle can be slowed down or sped up.

Figure 4:
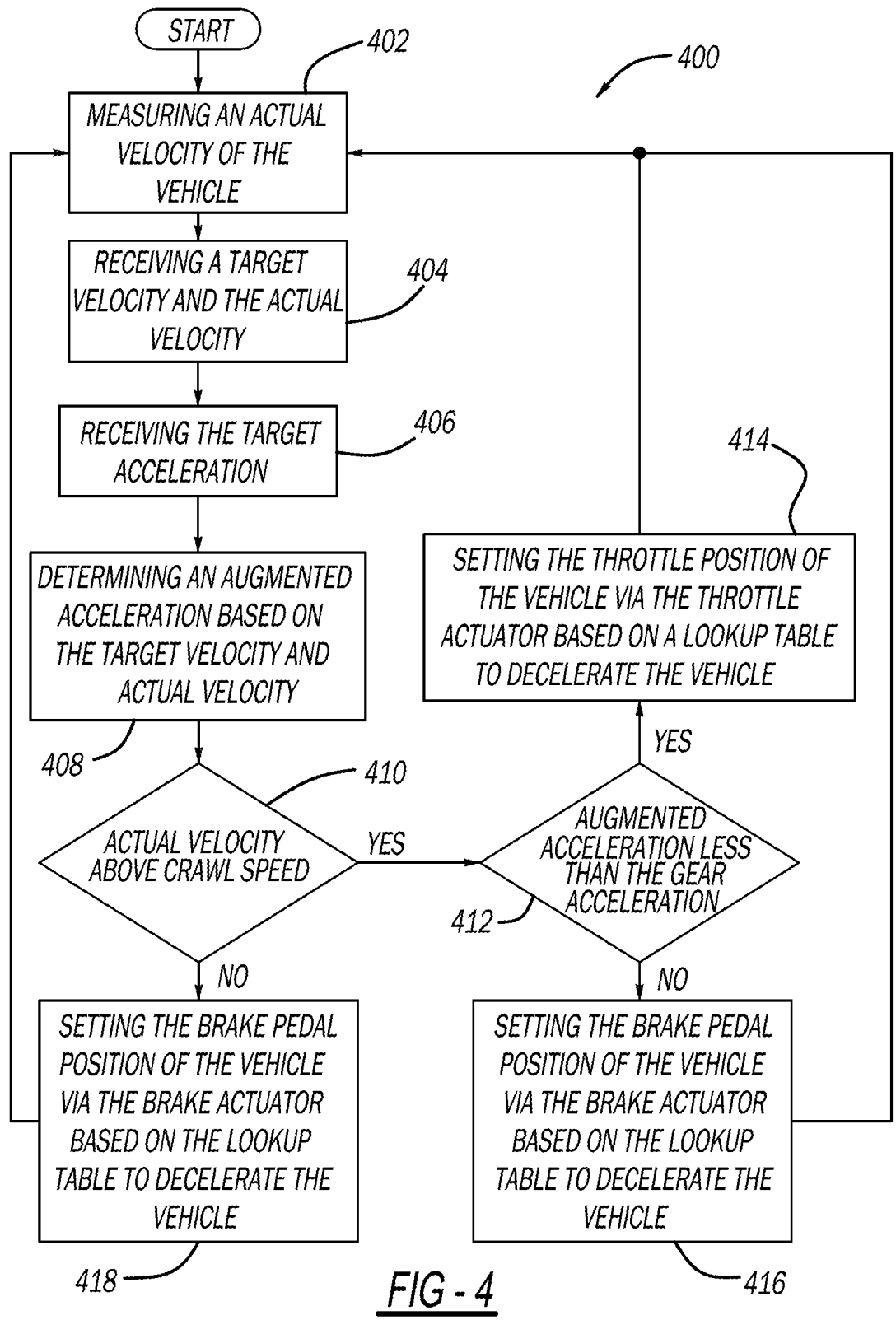
FIG. 4 illustrates a method for controlling the velocity of the vehicle.

Referring to FIG. 4, a method for controlling the vehicle is shown. Here, in step 402, the processor 102 is configured to measure an actual velocity ($v_{actual}$) of the vehicle. This may be accomplished by receiving information from the velocity sensor 104. In step 404, the processor 102 receives a target velocity ($v_{target}$) and the actual velocity ($v_{actual}$) of the vehicle. The target velocity ($v_{target}$) may come from the autonomous vehicle control system 120 and the actual velocity ($v_{actual}$) may come from the velocity sensor 104.

In step 406, the processor is configured to receive the target acceleration ($a_{target}$) which may come from the autonomous vehicle control system 120.

In step 408, the processor 102 is configured to determine augmented acceleration ($a_{aug}$) based on the target velocity ($v_{target}$) and actual velocity ($v_{actual}$A). Alternatively, the augmented acceleration ($a_{aug}$) may be based on the target velocity ($v_{target}$), actual velocity ($v_{actual}$), and a grade ($\theta$) of a road the vehicle is travelling on. In one example:

$$a_{aug} = a_{target} + \lambda \cdot (v_{target} - v_{actual}) + p \cdot \sin\theta;$$

wherein $\lambda$ is a tunable parameter, providing closed loop feedback for plant variation and disturbance rejection and wherein p is a tunable parameter providing compensation for road grade.

Thereafter, in step 410, a determination is made whether the actual velocity ($v_{actual}$) is above the crawl speed of the vehicle. This crawl speed of the vehicle is generally defined as the speed in which the vehicle maintains when it is at idle and in gear and may be about 6 kph. If the actual velocity ($v_{actual}$); is above the crawl speed, the method continues to step 412.

In step 412, a determination is made if the augmented acceleration ($a_{aug}$) is less than the gear acceleration. If this is the case, the processor 102 is configured, as shown in step 414, to set the throttle position of the vehicle by the throttle control system 114 based on the look-up table to decelerate the vehicle. If not, the method to step 416 wherein the processor is configured to set the brake pedal position using the braking control system 116 based on the look-up table to decelerate the vehicle.

If we step back to step 412—if it is determined that the actual velocity ($v_{actual}$) is not above a crawl speed, the method continues to step 418 wherein the processor 102 is configured to set the brake pedal position of the vehicle by the brake control system 116 based on the look-up table to decelerate the vehicle.

After steps 414, 416, or 418 of an executed, the method then returns again to step 402.

Figure 5A:
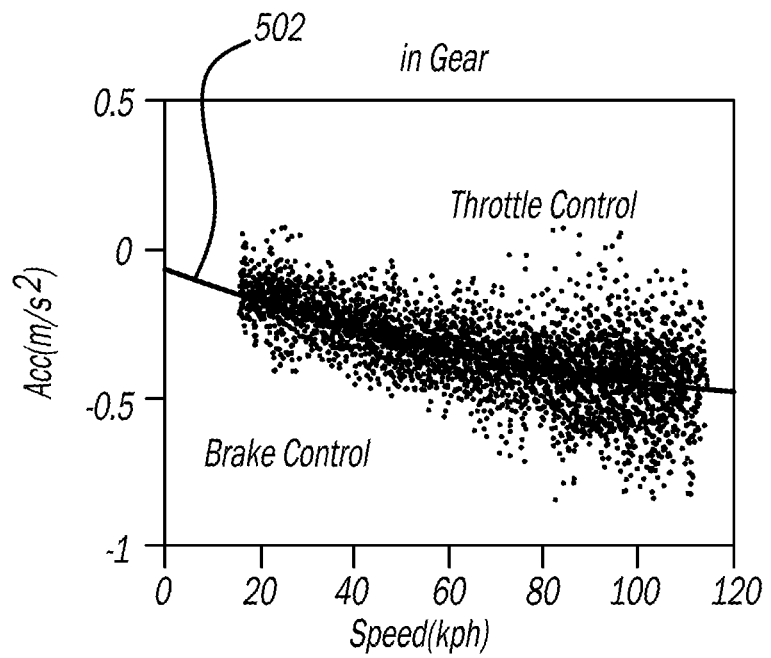
FIGS. 5A, 5B and 6 illustrate look up tables
Figure 5B:
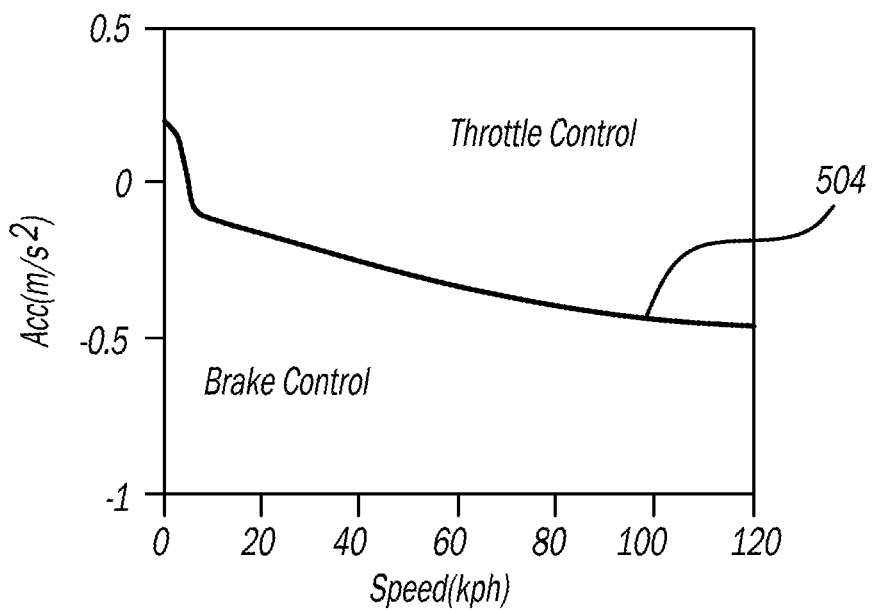

Referring to FIGS. 5A and 5B, a graph of a look-up table for determining to control the acceleration of the vehicle using either the throttle control system 114 or the brake control system 116 is shown. FIG. 5a illustrates a line 502 that demarks when a throttle control should be utilized or when a brake control is utilized. The throttle control is utilized when located above the line 502 and the brake control is utilized when located below the line 502. The inventors have noticed that using a look-up table disclosed in FIG. 5a results in poor control of the vehicle especially at low speeds. As such, as shown in FIG. 5b, a modified look-up table wherein the line 504 is utilized to demark between when utilizing the throttle control and the brake control. As can be seen in FIG. 5b, brake control is utilized in increasing fashion as the speed of the vehicle decreases. By so doing, the vehicle 100 will be under better control at lower speeds.

Figure 6:
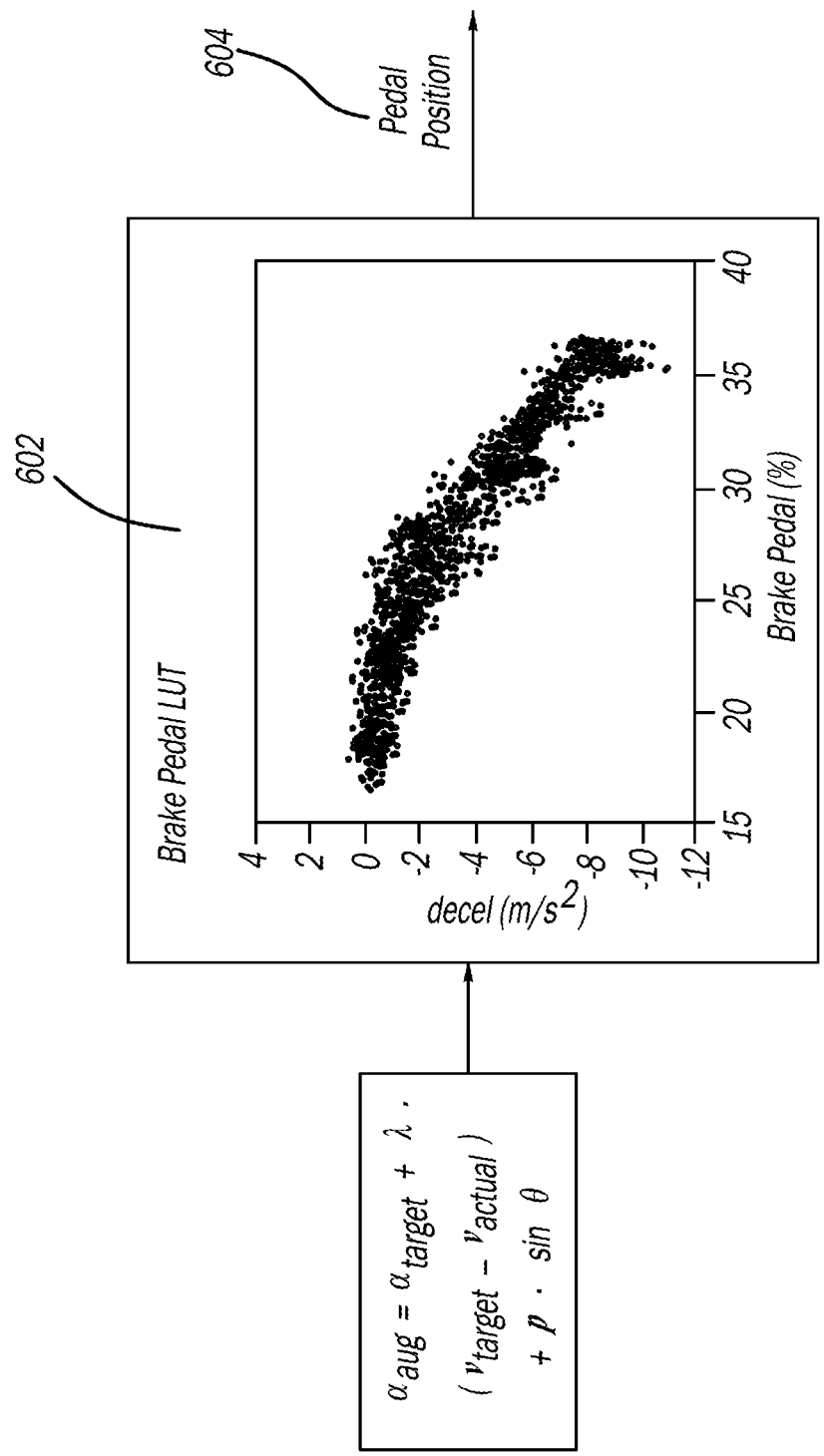

FIG. 6 illustrates a pedal look-up table 612 utilized to determine the pedal position 604. As input to the look-up table 612 an augmented acceleration is determined so as provided input to the brake look-up table 602. Based on the brake look-up table 602, a pedal position will be outputted 604 and this pedal position is then outputted to the brake control system.

If the brake system is utilized, a brake look-up table 318 is utilized so as to determine how much force of the brake should be utilized based on the target speed 302, the target acceleration 306 and the actual speed 308. This look-up table provides the appropriate amount of brake pressure to the data speed brake box 320 which in turn adjusts the brake pedal position 322 of the vehicle 100. The brake lookup table may be stored within the memory device 103 of FIG. 1. As such, the brake of the vehicle can be applied and removed and a certain amount of pressure can be applied to the brake pedal. This eventually results in a vehicle speed 324 which is then fed back into the filtering and estimation module 304.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. A system to control the velocity of a vehicle, the system comprising:
   a processor;
   a velocity sensor in communication with the processor, the velocity sensor configured to measure an actual velocity of the vehicle;
   a throttle actuator in communication with the processor, the throttle actuator being configured to control a throttle of the vehicle;
   a brake actuator in communication with the processor, the brake actuator being configured to control one or more brakes of the vehicle;
   a memory in communication with the processor, the memory having a lookup table stored within the memory, the lookup table listing a plurality of throttle positions and brake pressure amounts based on the actual velocity ($v_{actual}$) and a target acceleration ($a_{target}$) of the vehicle; and
   the processor being configured to:
      receive a target velocity ($v_{target}$) and the actual velocity ($v_{actual}$);
      receive the target acceleration ($a_{target}$);
      determine an augmented acceleration ($a_{aug}$) based on the target velocity ($v_{target}$) and the actual velocity ($v_{actual}$);
      determine if the augmented acceleration ($a_{aug}$) is greater than or equal to a gear acceleration ($a_{gear}$);
      set the throttle position of the vehicle via the throttle actuator based on the lookup table to decelerate the vehicle when the augmented acceleration ($a_{aug}$) is greater than or equal to the gear acceleration ($a_{gear}$) and the actual velocity ($v_{actual}$) is above a crawl speed,
      determine if the augmented acceleration ($a_{aug}$) is less than the gear acceleration ($a_{gear}$);
      actuate the one or more brakes of the vehicle based on the lookup table to decelerate the vehicle when the augmented acceleration ($a_{aug}$) is less than the gear acceleration ($a_{gear}$) and the actual velocity ($v_{actual}$) is above the crawl speed, and
      actuate the one or more brakes of the vehicle based on the lookup table to decelerate the vehicle when the actual velocity ($v_{actual}$) is below the crawl speed.

2. The system of claim 1, wherein the processor is configured to determine the augmented acceleration ($a_{aug}$) based on the target velocity ($v_{target}$), actual velocity ($v_{actual}$), and a grade (θ) of a road the vehicle is travelling on.

3. The system of claim 1, wherein:

$$a_{aug}=a_{target}+\lambda \cdot (v_{target}-v_{actual})+p \cdot \sin\theta;$$

wherein λ is a tunable parameter; and
   wherein p is a tunable parameter providing compensation for road grade.

4. The system of claim 1, wherein the crawl speed is approximately 6 km/h.

5. The system of claim 1, wherein the velocity sensor is a wheel speed sensor.

6. The system of claim 1, wherein the augmented acceleration ($a_{aug}$) includes a non-zero value.

7. A method to control the velocity of a vehicle, the method comprising the steps of:
   measuring an actual velocity ($v_{actual}$) of the vehicle using a velocity sensor mounted to the vehicle;
   receiving a target velocity ($v_{target}$) and the actual velocity ($v_{actual}$);
   receiving the target acceleration ($a_{target}$);
   determining an augmented acceleration ($a_{aug}$) based on the target velocity ($v_{target}$) and actual velocity ($v_{actual}$);
   determining if the augmented acceleration ($a_{aug}$) is greater than or equal to a gear acceleration ($a_{gear}$);
   setting the throttle position of the vehicle via the throttle actuator based on a lookup table to decelerate the vehicle when the augmented acceleration ($a_{aug}$) is greater than or equal to the gear acceleration ($a_{gear}$) and the actual velocity ($v_{actual}$) is above a crawl speed, wherein the lookup table comprises a plurality of throttle positions and brake pressure amounts based on the actual velocity ($v_{actual}$) and a target acceleration ($a_{target}$) of the vehicle;
   determining if the augmented acceleration ($a_{aug}$) is less than the gear acceleration ($a_{gear}$);
   actuating a vehicle brake based on the lookup table to decelerate the vehicle when the augmented acceleration ($a_{aug}$) is less than the gear acceleration ($a_{gear}$) and the actual velocity ($v_{actual}$) is above the crawl speed; and
   actuating the vehicle brake based on the lookup table to decelerate the vehicle when the actual velocity ($v_{actual}$) is below the crawl speed.

8. The method of claim 7, further comprising the steps of determining the augmented acceleration ($a_{aug}$) based on the target velocity ($v_{target}$), actual velocity ($v_{actual}$), and a grade (θ) of a road the vehicle is travelling on.

9. The method of claim 7, wherein:

$$a_{aug}=a_{target}+\lambda \cdot (v_{target}-v_{actual})+p \cdot \sin\theta;$$

wherein λ is a tunable parameter; and
   wherein p is a tunable parameter providing compensation for road grade.

10. The method of claim 7, wherein the crawl speed is approximately 6 km/h.

11. The method of claim 7, wherein the velocity sensor is a wheel speed sensor.

12. The method of claim 7, wherein the augmented acceleration ($a_{aug}$) includes a non-zero value.

* * * * *